United States Patent
Pfadler et al.

(10) Patent No.: US 11,290,853 B2
(45) Date of Patent: Mar. 29, 2022

(54) SYSTEM, TRANSPORTATION VEHICLE, APPARATUSES, METHODS, AND COMPUTER PROGRAMS FOR USER EQUIPMENT AND FOR A BASE STATION IN A MOBILE COMMUNICATION SYSTEM

(71) Applicant: VOLKSWAGEN AKTIENGESELLSCHAFT, Wolfsburg (DE)

(72) Inventors: Andreas Pfadler, Berlin (DE); Steffen Schmitz, Wesel (DE); Andreas Kwoczek, Lehre (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/789,991

(22) Filed: Feb. 13, 2020

(65) Prior Publication Data
US 2020/0267512 A1   Aug. 20, 2020

(30) Foreign Application Priority Data
Feb. 15, 2019   (EP) .................................. 19157421

(51) Int. Cl.
| | |
|---|---|
| H04W 4/06 | (2009.01) |
| H04W 8/00 | (2009.01) |
| H04W 88/04 | (2009.01) |
| H04W 88/08 | (2009.01) |
| H04W 84/04 | (2009.01) |
| H04W 4/08 | (2009.01) |

(52) U.S. Cl.
CPC ............ *H04W 4/06* (2013.01); *H04W 8/005* (2013.01); *H04W 88/04* (2013.01); *H04W 88/08* (2013.01)

(58) Field of Classification Search
CPC ....... H04W 4/06; H04W 8/005; H04W 88/04; H04W 88/08; H04W 84/047; H04W 4/08
USPC ......................................................... 370/329
See application file for complete search history.

(56) References Cited

U.S. PATENT DOCUMENTS

| | | | |
|---|---|---|---|
| 9,191,785 B2 | 11/2015 | Kim et al. | |
| 10,271,310 B2* | 4/2019 | Zhang | ............... H04L 5/023 |
| 2013/0130736 A1 | 5/2013 | Kim et al. | |
| 2013/0250771 A1 | 9/2013 | Yu et al. | |

(Continued)

FOREIGN PATENT DOCUMENTS

| | | |
|---|---|---|
| CN | 104717714 A | 6/2015 |
| CN | 105846882 A | 8/2016 |

(Continued)

OTHER PUBLICATIONS

Office Action for Korean Patent Application No. 10-2020-0017522; dated Jan. 9, 2021.

(Continued)

*Primary Examiner* — Inder P Mehra
(74) *Attorney, Agent, or Firm* — Barnes & Thornburg LLP

(57) ABSTRACT

A system, a transportation vehicle, apparatuses, methods, and computer programs for user equipment (UE) and a base station in a mobile communication system. The method for user equipment in the mobile communication system includes determining a coverage situation of the mobile communication system, forming a group of multiple UEs, and communicating a unicast message to multiple UEs of the group of UEs based on the coverage situation of the mobile communication system.

15 Claims, 9 Drawing Sheets

(56) References Cited

U.S. PATENT DOCUMENTS

| | | | |
|---|---|---|---|
| 2015/0036579 | A1 | 2/2015 | Wu et al. |
| 2017/0019833 | A1 | 1/2017 | Luo et al. |
| 2017/0353819 | A1* | 12/2017 | Yin ................... H04L 47/30 |
| 2018/0077518 | A1 | 3/2018 | Nguyen et al. |
| 2018/0199174 | A1* | 7/2018 | Gozalvez-Serrano ................ G08G 1/161 |
| 2018/0270875 | A1* | 9/2018 | Hampel ............ H04W 74/0833 |
| 2019/0258243 | A1* | 8/2019 | Meier ................. G06N 20/00 |
| 2019/0349892 | A1* | 11/2019 | Rico Alvarino ........ H04W 8/22 |
| 2020/0092685 | A1* | 3/2020 | Fehrenbach ......... H04B 7/2606 |
| 2020/0221423 | A1* | 7/2020 | Wang ................ H04B 17/318 |
| 2021/0045093 | A1* | 2/2021 | Rao ..................... H04W 76/00 |
| 2021/0058748 | A1* | 2/2021 | Liao .................... H04W 76/11 |

FOREIGN PATENT DOCUMENTS

| | | |
|---|---|---|
| CN | 105992143 A | 10/2016 |
| EP | 3028482 A1 | 6/2016 |
| KR | 20120034037 A | 4/2012 |
| WO | 2016015764 A1 | 2/2016 |
| WO | 2017075920 A1 | 5/2017 |
| WO | 2018144081 A1 | 8/2018 |

OTHER PUBLICATIONS

Office Action for Chinese Patent Application No. 202010092787.4; dated Jun. 28, 2021.
Office Action for Chinese Patent Application No. 202010092787.4; dated Dec. 1, 2021.

* cited by examiner

SYSTEM, TRANSPORTATION VEHICLE, APPARATUSES, METHODS, AND COMPUTER PROGRAMS FOR USER EQUIPMENT AND FOR A BASE STATION IN A MOBILE COMMUNICATION SYSTEM

PRIORITY CLAIM

This patent application claims priority to European Patent Application No. 19157421.9, filed 15 Feb. 2019, the disclosure of which is incorporated herein by reference in its entirety.

SUMMARY

Illustrative embodiments relate to a system, a transportation vehicle, apparatuses, methods, and computer programs for user equipment, UE, and a base station in a mobile communication system, more particularly, but not exclusively, to a concept for transmitting a unicast message to a group of UEs for further relaying in an out-of-coverage situation.

BRIEF DESCRIPTION OF THE DRAWINGS

Disclosed embodiments will be described using the following non-limiting embodiments of apparatuses or methods or computer programs or computer program products by way of example only, and with reference to the accompanying figures, in which.

DETAILED DESCRIPTION

Figure 1:
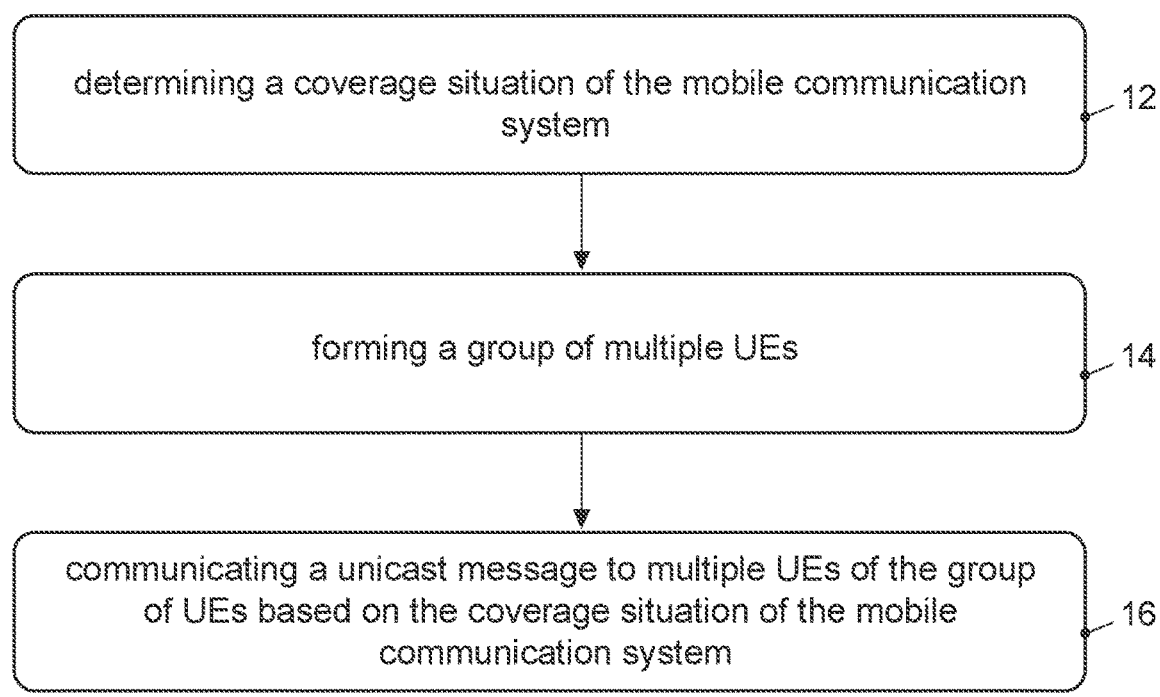
FIG. 1 illustrates a block diagram of an embodiment of a method for user equipment.

Document US 2018/0077518 A1 describes a concept for sharing sensor data among transportation vehicles. Common information is broadcast to nearby transportation vehicles. Based on the common information some transportation vehicles may request more detailed information. Unicast and/or multicast sessions may be set up to share the detailed information. Document WO 2017/075920 A1 discloses a data transmission method and device for transportation vehicle communications, base station, and network side device. The data transmission method determines, according to a number of receiving terminals receiving the transportation vehicle communication data or according to instruction information sent by the sending terminal, whether to use a unicast mode or a broadcast mode to transmit the transportation vehicle communication data. If a broadcast mode is determined to be used to transmit the transportation vehicle communication data, then a range where the transportation vehicle communication data needs to be broadcast is determined. According to the range where the transportation vehicle communication data needs to be broadcast, a single-cell broadcast mode or a multi-cell broadcast mode to transmit the transportation vehicle communication data is selected. R2-1818728 is a 3GPP (3rd Generation Partnership Project) meeting contribution relating to unicast, groupcast, and broadcast support for in-coverage, out-of-coverage, and partial coverage scenarios.

Document US 2013/0250771 A1 discloses that public safety networks, such as long-term evolution (LTE) based public safety networks, can benefit from device-to-device enhanced voice group call. A method can include serving at least one user equipment. The method can also include controlling device-to-device cluster establishing for the at least one user equipment based on at least one reference signal. This use of device-to-cluster establishment based on at least one reference signal can be applied in various ways, including being applied to group calls.

Conventional concepts evaluate different communication possibilities for inter vehicular communication in different coverage scenarios. Communication with communication partners, which are out-of-coverage, is not considered.

There is a demand for an improved concept for communicating in different coverage scenarios of a mobile communication system.

Disclosed embodiments are based on the finding that UEs can be organized in groups for group communication and that the UEs within such a group may experience different coverage scenarios. It is a further finding that a UE being out-of-coverage, OOC, of a base station may still communicate with such a base station through one or more other UEs, which are in the same group and in coverage of the base station. The OOC-UE may broadcast or multicast a message, which is actually a unicast message, to the group of UEs, and group members may then forward the message.

Disclosed embodiments provide a method for user equipment, UE, in a mobile communication system. The method comprises determining a coverage situation of the mobile communication system, forming a group of multiple UEs, and communicating a unicast message to multiple UEs of the group of UEs based on the coverage situation of the mobile communication system. A reliability or robustness of wireless communication may be increased by communicating a unicast message to multiple UEs. Disclosed embodiments may enable an enhanced uplink communication in a mobile communication system.

The communicating of the unicast message directed to the multiple UEs of the group of UEs may be carried out if the UE is out of coverage of a base station of the mobile communication system in some disclosed embodiments. Coverage of a base station may be enhanced by using group communication.

For example, the unicast message directed to multiple UEs of the group of UEs may be comprised in or wrapped into a multicast or broadcast message. The forming of the group of UEs may comprise assigning a group or groupcast identification to the group of UEs. In some disclosed embodiments the method may further comprise using the group identification or a groupcast identification to address the unicast message to the group of UEs. Disclosed embodiments may enable a simple and efficient mechanism to enhance coverage in a mobile communication system using direct communication between UEs.

In some disclosed embodiments the forming of the group of UEs may comprise determining group members based on a common geographic path or location of the UEs. Disclosed embodiments may form groups or clusters of co-allocated UEs or UEs sharing the same route. Such grouping or clustering may further contribute to enhance communication efficiency.

The determining of the coverage situation may comprise looking up coverage information in a coverage map based on a location of the UE. Coverage maps may contribute to a simple and efficient way of distinguishing areas with different coverage qualities/situations. Additionally or alternatively, the determining of the coverage situation may comprise measuring a signal from the mobile communication system, wherein the signal is indicative of the coverage of the mobile communication system. Coverage measurements may help determining an up-to-date coverage situation at certain location, even when the network infrastructure changes (for example, added base stations/cells).

The method may, in some further disclosed embodiments, include receiving a message, which is addressing multiple UEs, from another UE. The method may further include determining whether the message is a unicast message, which was transmitted to multiple UEs, and relaying the message if it is a unicast message, which was transmitted to multiple UEs. UEs may be configured to relay such messages to eventually transmit the message to its dedicated receiver. The relaying may comprise relaying the unicast message to another UE, to a base station of the mobile communication system, or to the group of UEs. UEs may establish an adaptive and dynamic adhoc network component.

Disclosed embodiments further provide a method for user equipment, UE, in a mobile communication system. The method includes receiving a message, which is addressing multiple UEs, from another UE, determining whether the message is a unicast message, which was transmitted to multiple UEs, and relaying the message if it is a unicast message, which was transmitted to multiple UEs. UEs may therewith be enabled to form a multi-hop or adhoc network component, even if they are not capable of transmitting a unicast message to multiple UEs. The relaying may include relaying the unicast message to another UE, to a base station of the mobile communication system, or to the group of UEs.

An apparatus for user equipment, UE, in a mobile communication system is another disclosed embodiment. The apparatus includes one or more interfaces, which are configured to communicate in the mobile communication system. The apparatus further includes a control module, which is configured to control the one or more interfaces. The control module is further configured to perform one of the methods described herein.

Another disclosed embodiment is a method for a base station in a mobile communication system. The method includes determining an out-of-coverage situation for user equipment, UE, to which a message is to be sent. The method further includes determining an identification of a group of multiple UEs the UE is assigned to. The method further includes transmitting the message to the group of UEs for relaying to the UE. Disclosed embodiments may also enable to use an adhoc or multi-hop network component in the downlink.

The method may further include receiving an acknowledgment message for the message from a UE of the group. Disclosed embodiments may use the adhoc or multi-hop component for receiving acknowledgements for transmitted messages or data packets.

Disclosed embodiments also provide an apparatus for a base station in a mobile communication system. The apparatus includes one or more interfaces, which are configured to communicate in the mobile communication system. The apparatus further includes a control module, which is configured to control the one or more interfaces. The control module is further configured to perform one of the methods described herein. A further disclosed embodiment is a transportation vehicle comprising one of the apparatuses described herein.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an disclosed embodiment of a method 10 for user equipment, UE, in a mobile communication system. The method 10 includes determining 12 a coverage situation of the mobile communication system, forming 14 a group of multiple UEs, and communicating 16 a unicast message to multiple UEs of the group of UEs based on the coverage situation of the mobile communication system. For example, the communicating 16 of the unicast message directed to multiple UEs of the group of UEs is carried out if the UE is out of coverage of a base station of the mobile communication system.

The method 10 describes the behavior from the perspective of a first UE, which, for example, tries to send a message to a second UE, which is located far away. Since the second UE cannot be reached directly and further assuming that there is no coverage of a base station, the first UE sends the unicast message to a group of UEs. Herein a unicast message is a message, which is sent point-to-point (ptp), i.e., from one sender to one addressee. A multicast message is a message, which is sent point-to-multipoint (ptm), i.e., from one sender to multiple addressees, e.g., a group of UEs or service subscribers etc. A broadcast message is a message, which is sent point-to-multipoint (ptm), i.e., from one sender to any addressee, e.g., any receiver located in the coverage of the sender.

Figure 2:
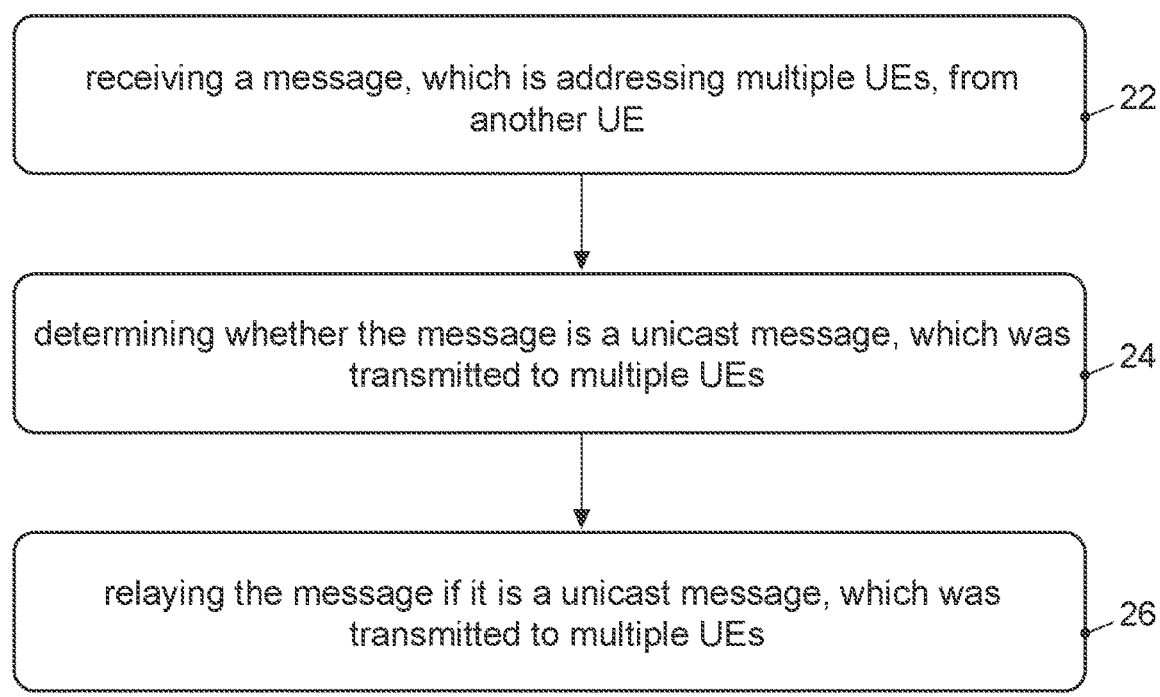
FIG. 2 illustrates a block diagram of an embodiment of another method for user equipment.

FIG. 2 illustrates a block diagram of an disclosed embodiment of a method 20 for user equipment, UE of the group, in a mobile communication system. Method 20 describes the behavior of a UE in the group of UEs. The method 20 includes receiving 22 the message, which is addressing multiple UEs, from another UE (the first UE). The method further includes determining 24 whether the message is a unicast message, which was transmitted to multiple UEs, and relaying 26 the message if it is a unicast message, which was transmitted to multiple UEs. In an exemplary embodiment the second UE relay the message to other UEs of the group, to other UEs of another group or to a base station. The relaying 26 may include relaying the unicast message to another UE, to a base station of the mobile communication system, or to the group of UEs.

This way, disclosed embodiments may establish a communication chain (multi-hop/adhoc network), which can eventually lead to the above second UE, which could be directly or via the network infrastructure (base station). In the other direction, downlink, the same consideration may apply. The procedure then starts at a base station.

Figure 3:
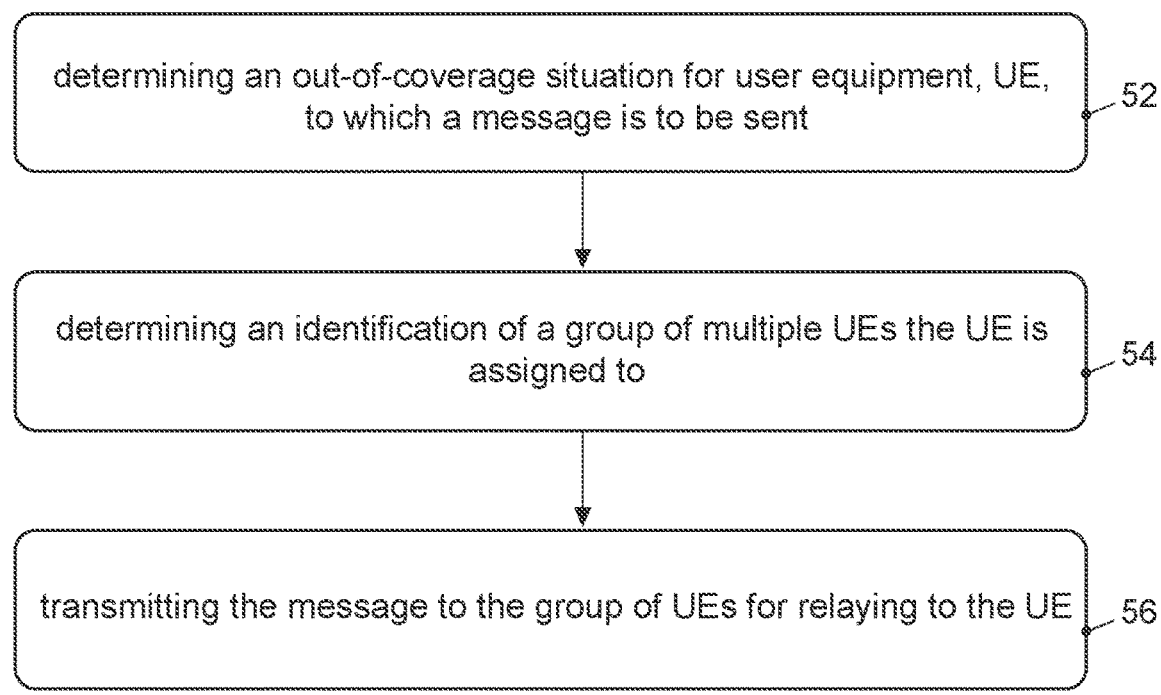
FIG. 3 illustrates a block diagram of an embodiment of a method for a base station.

FIG. 3 illustrates a block diagram of an exemplary embodiment of a method 50 for a base station in a mobile communication system. The method 50 includes determining 52 an out-of-coverage situation for user equipment, UE, to which a message is to be sent. The method 50 further includes determining 54 an identification of a group of multiple UEs the UE is assigned to. The method 50 further includes transmitting 56 the message to the group of UEs for relaying to the UE. This method 50 may apply if the base station knows a group the target UE is assigned to but has no direct link to the UE. The coverage may then be extended by using other group members to eventually reach the desired UE through relaying as described above. The method may further include receiving an acknowledgment message for the message from a UE of the group.

Figure 4:
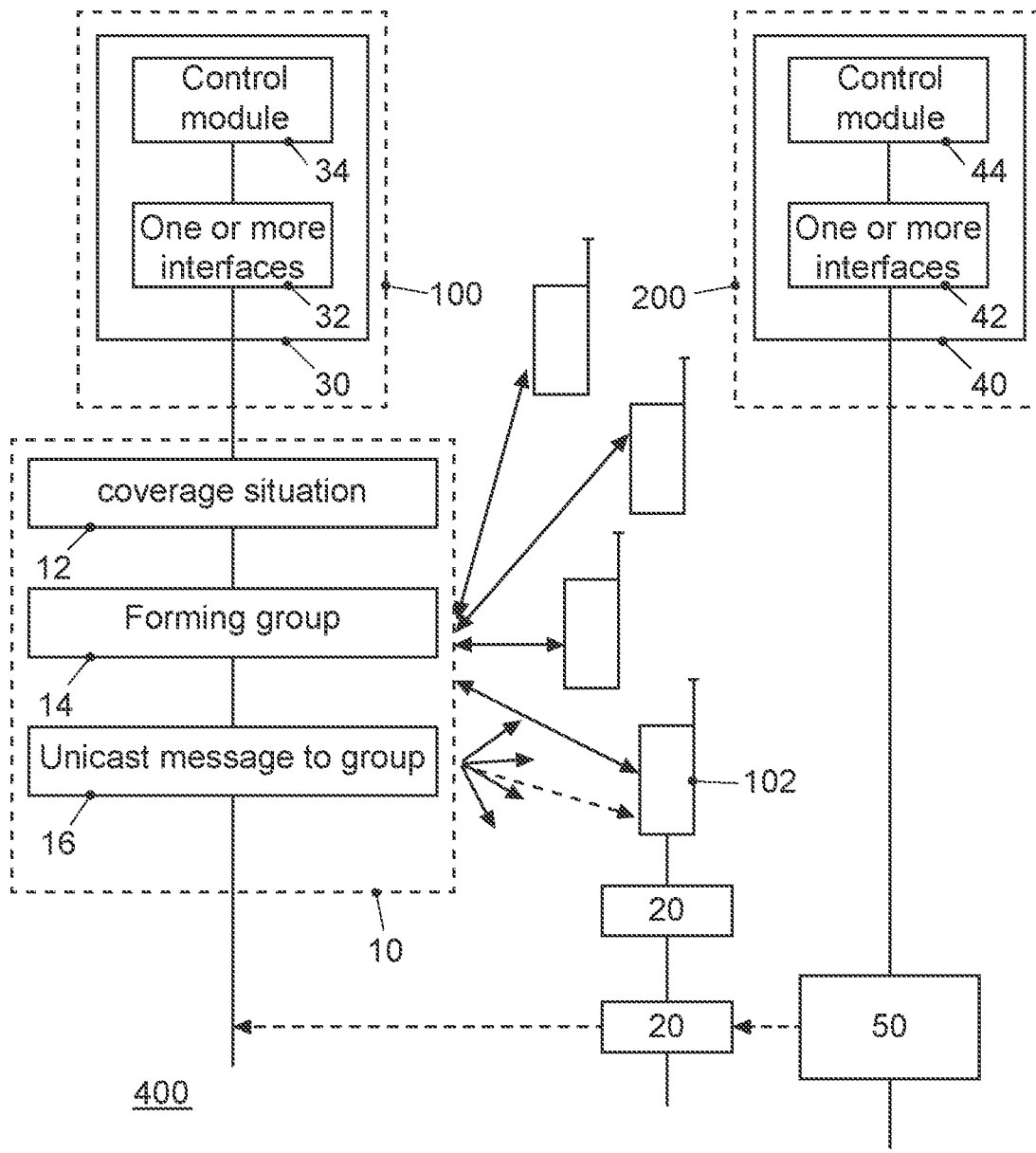
FIG. 4 shows an embodiment of an apparatus for a UE, an embodiment of an apparatus for a base station, and an embodiment of a system.

FIG. 4 shows an exemplary embodiment of an apparatus 30 for a UE 100, an exemplary embodiment of an apparatus 40 for a base station 200, and an exemplary embodiment of a system 400. The apparatus 30 for the UE 100 includes one or more interfaces 32 configured to communicate in the mobile communication system 400. The apparatus 30 further includes a control module 34, which is coupled to the one or more interfaces 32 and which is configured to control the one or more interfaces 32. The control module 34 is further configured to perform one of the methods 10, 20 as described herein.

The apparatus 40 for the base station 200 in a mobile communication system 400 includes one or more interfaces 42, which are configured to communicate in the mobile communication system 400. The apparatus 40 further includes a control module 44, which is coupled to the one or more interfaces 42 and which is configured to control the one or more interfaces 42. The control module 44 is further configured to perform one of the methods 50 as described herein. The apparatus 40 may be included in a base station 200, a NodeB, a relay station, or any service coordinating network entity in disclosed embodiments. A further disclosed embodiment is a transportation vehicle comprising the apparatus 30 and/or the apparatus 40.

In disclosed embodiments, the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may include further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, application requirements, trigger indications, requests, messages, data packets, acknowledgement packets/messages, etc.

As shown in FIG. 4 the respective one or more interfaces 32, 42 are coupled to the respective control modules 34, 44 at the apparatuses 30, 40. In disclosed embodiments the control modules 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may include a general purpose processor, a Digital Signal Processor (DSP), a micro-controller, etc.

FIG. 4 also shows an exemplary embodiment of a system 400 comprising disclosed embodiments of UE 100, and a base station 200 comprising the apparatus 40. In disclosed embodiments, communication, i.e., transmission, reception or both, may take place among mobile transceivers/transportation vehicles 100 directly and/or between mobile transceivers/transportation vehicles 100 and a network component (infrastructure or mobile transceiver, e.g., a base station, a network server, a backend server, etc.). Such communication may make use of a mobile communication system 400. Such communication may be carried out directly, e.g., by device-to-device (D2D) communication, which may also include vehicle-to-vehicle (V2V) or car-to-car communication in case of transportation vehicles 100. Such communication may be carried out using the specifications of a mobile communication system 400.

In disclosed embodiments the one or more interfaces 32, 42 can be configured to wirelessly communicate in the mobile communication system 400. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 4 also illustrates the methods 10 and 20, 50 as described above. The uplink scenario is explained first. The UE 100 wants to send a message to the base station 200 and determines 12 a coverage situation of the mobile communication system. It finds itself out of coverage of the base station 200 and forms 14 a group with other UEs. This group may as well have been established beforehand. The group is indicated by the four schematic UEs in the center of FIG. 4 liked with double sided arrows to the UE 100. The UE 100 then communicates 16 a unicast message to multiple UEs (indicated by the single-ended arrows) of the group of UEs based on the coverage situation of the mobile communication system 400. The UE 102 in this disclosed embodiment carries out the method 20, cf. FIG. 2. Accordingly, it receives the message from UE 100, which is addressing the multiple UEs. UE 102 determines 24 whether the message is a unicast message, which was transmitted to multiple UEs and hence relays 26 the message to the base station 200.

For the downlink direction the method 50 is carried out at the base station 200. The base station 200 has a message or data packet to be transmitted to UE 100. The base station 200 determines 52 an out-of-coverage situation for the UE 100. The base station 200 determines 54 an identification of a group of multiple UEs the UE is assigned to. This group may have existed beforehand. The base station 200 hence transmits 56 the message to the group of UEs for relaying to the UE 100. UE 102 receives the message, carries out the method and relays the message to the UE 100, i.e., it relays in the opposite direction as compared to the above uplink scenario.

The mobile communication system 400, as shown in FIG. 4, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or include, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver 200, a relay station or a UE, e.g., coordinating service provision in a cluster or group of multiple UEs. A base station transceiver can be operable or configured to communicate with one or more active mobile transceivers/transportation vehicles 100, 102 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100, 102 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 102 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc.

Figure 5:
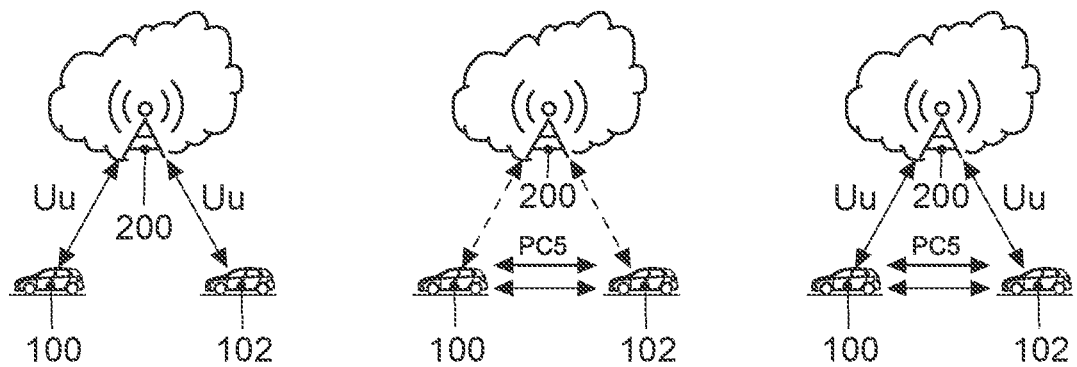
FIG. 5 illustrates communication link configurations in embodiments.

FIG. 5 illustrates communication link configurations in disclosed embodiments, which are in line with 3GPP, cf. R2 1818728. FIG. 5 illustrates three communication scenarios in an exemplary embodiment using a 3GPP 5G or NR network/system. On the left-hand side two transportation vehicles/mobile transceivers 100, 102 communicate with a base station 200 over the Uu air interface. In the center the two transportation vehicles 100, 102 communicate directly with each other using D2D and the PC5 air interface. On the right hand side the two transportation vehicles 100, 102 use both air interfaces Uu (towards base station 200) and PC5 (D2D) for communication.

Figure 6:
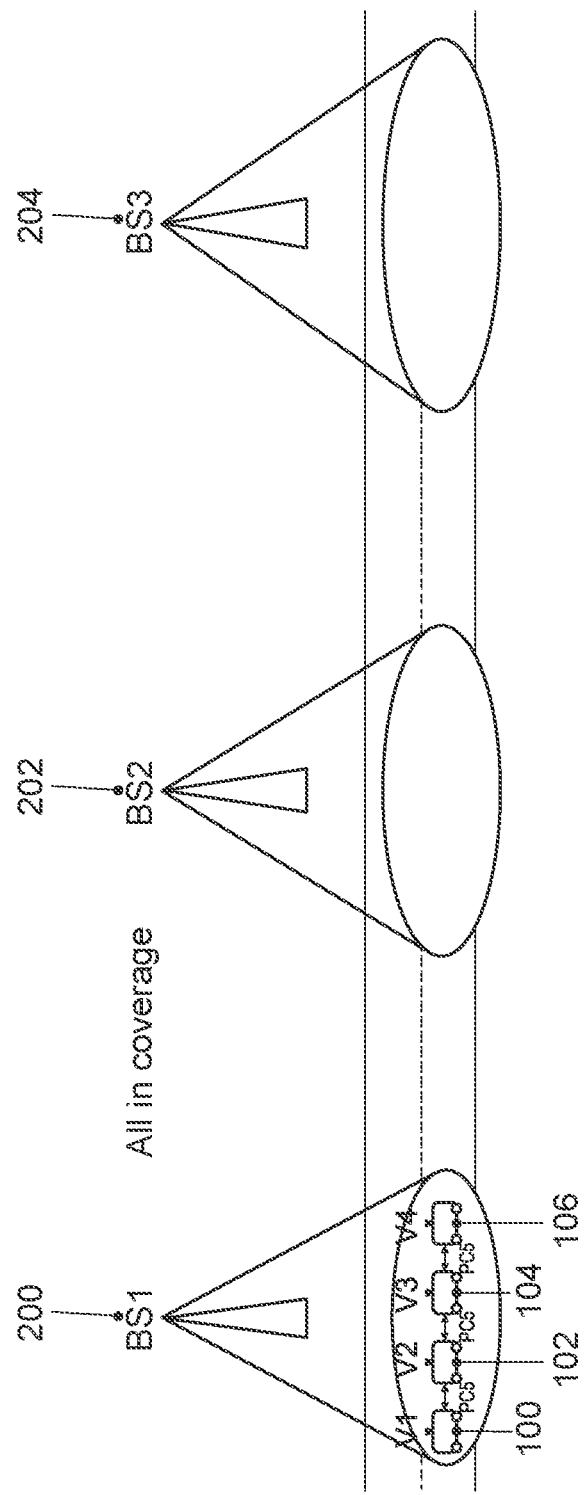
FIG. 6 illustrates an all-in-coverage scenario in an embodiment.

FIG. 6 illustrates an all-in-coverage scenario in an exemplary embodiment. FIG. 6 shows three base stations BS1-3 (200, 202, and 204). A group of transportation vehicles V1-4 (100, 102, 104, and 106) are all located in the coverage of BS1 and the transportation vehicles use PC5 communication to exchange information, for example, location and speed data, route data, environmental data, sensor data, etc.

Figure 7:
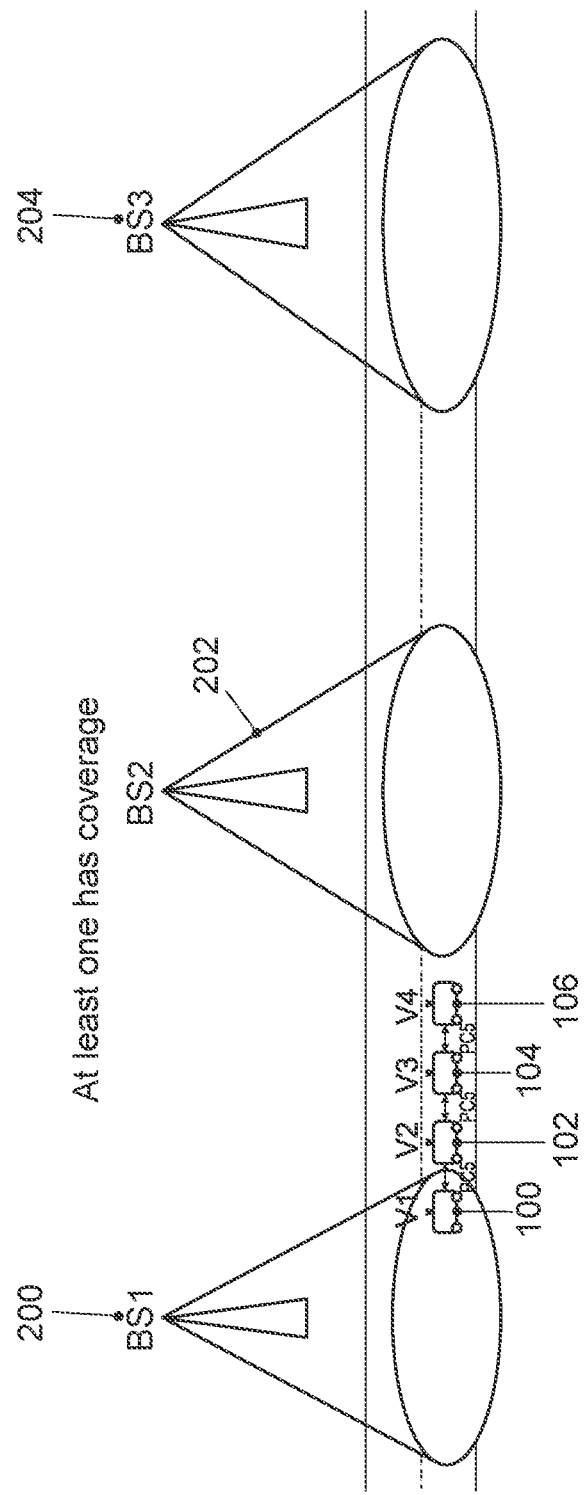
FIG. 7 illustrates a scenario in which at least one transportation vehicle has coverage in an embodiment.

FIG. 7 illustrates a scenario in which at least one transportation vehicle has coverage in an exemplary embodiment. The scenario shows the same components as FIG. 6. The group of transportation vehicles V1-4 has moved on towards the right in FIG. 7, where only transportation vehicle V1, 100 is in coverage of BS1, 200. The other three transportation vehicles V2-4 are in between the coverage areas of BS1 and BS2. Hence, in such a scenario transportation vehicles V2-4 cannot directly communicate with any base station 200, 202, 204 because of lack of coverage. However, they can still communicate within the group via PC5. For example, transportation vehicle V4, 106 may communicate a message, which is addressing a recipient not shown in FIG. 7, to transportation vehicle 104. Transportation vehicle 104 in turn could forward to transportation vehicle 102 and transportation vehicle 102 could forward it to transportation vehicle 100. Transportation vehicle 100 could forward it to the base station 200. Likewise, the base station 200 could communicate a message to transportation vehicle 106 through transportation vehicles 100, 102, 104 (multi-hop chain in the opposite direction).

In some disclosed embodiments the unicast message (message from V4 to base station 200 or vice versa) is directed to multiple UEs of the group of UEs wrapped up, tunneled or being included in a multicast or broadcast message. E.g., once a network component (e.g., UE or base station) notices that a recipient cannot directly be reached, the respective message or data packet can be packed into a broadcast or multicast message or packet, which is then sent out to the group. Such group communication may be organized by using certain identification. The forming 14 of the group of UEs may include assigning a group or groupcast identification to the group of UEs. Members of the group would then know and react to messages which are addressed with such an identification. The method may further include using the group identification or a groupcast identification to address the unicast message to the group of UEs. For example, the forming 14 of the group of UEs may include determining group members based on a common geographic path or location of the UEs. In the disclosed embodiment shown in FIGS. 6-9 the group of UEs may drive a certain highway section together (common path). The UEs/transportation vehicles may communicate their routes or destinations and hence find each other as road companions at least for a certain route section.

In disclosed embodiments certain protocol provisions may apply with respect to the forming of groups or clusters and with respect to relaying or repeating the message. For example, a message may include payload (e.g., the unicast message) and control information (e.g., header or tail information). The control information may have information relating to the forwarding and relaying of the message. For example, the control information may include an identifier so a UE could determine whether a message was received/relayed before. A UE may only repeat/relay a message for a predetermined number of times, e.g., once or twice. Moreover, a message may include a counter indicating how many times it has been relayed before. For example, the counter is increased any time the message gets relayed. These mechanisms may avoid loops and may limit the overhead introduced by the relaying mechanism.

The determining 12 of the coverage situation may include looking up coverage information in a coverage map based on a location of the UE/transportation vehicle 106. The transportation vehicle 106 may use a coverage map relating geographical locations to information on whether network coverage is available or not. Such a coverage map or coverage information may be stored in a memory or storage of the transportation vehicle. For example, such information may be made available for download by an operator of the mobile communication system 400. In other disclosed embodiments the determining 12 of the coverage situation may include measuring a signal from the mobile communication system 400. The signal is indicative of the coverage of the mobile communication system 400. Multiple such signals are known or conceivable, examples are reference signals/symbols, pilot signals/symbols, synchronization signals/symbols, etc. In disclosed embodiments multiple measurements are conceivable, which may lead to the coverage information. Such measurements may be based on a signal-to-noise ratio (SNR), signal-to-interference ratio (SIR), signal-to-noise-and-interference ratio (SINR), receive power strength, receive signal code power (RSCP), receive signal strength indicator (RSSI), pathloss, latency, etc.

From the perspective of UEs 100, 102, 104 the method 10 further includes receiving the message, which is addressing the multiple UEs, from UE 106 or the base station 200, and determining whether the message is a unicast message, which was transmitted to multiple UEs. The method then further includes relaying the message if it is a unicast message, which was transmitted to multiple UEs. The relaying includes relaying the unicast message to another UE, to a base station of the mobile communication system, or to the group of UEs. The method 10 describes the behavior of UE 106 in this disclosed embodiment, which sends the unicast message to the group of UEs 100, 102, 104 (uplink). From the perspective of one of the UEs 100, 102, 104 they may implement the above method 20, which describes the behavior as part of the group (relaying but not necessarily initiating the transmission of the unicast message to the group). The method 20 includes receiving 22 the message, which is addressing multiple UEs, from another UE (the first UE), determining 24 whether the message is a unicast message, which was transmitted to multiple UEs, and relaying 26 the message if it is a unicast message, which was transmitted to multiple UEs. The relaying or forwarding may be to other UEs of the group, to other UEs of another group or to a base station. As lined out above, the relaying may be limited by a counter (limited number of hops).

In the opposite direction from the base station 200 to the UE 106 (downlink) the above method 50 may be carried out. The method 50 includes determining 52 an out-of-coverage situation for user equipment, UE, to which a message is to be sent. The method 50 further includes determining 54 an identification of a group of multiple UEs the UE is assigned to. The method 50 further includes transmitting 56 the message to the group of UEs for relaying to the UE. This method 50 may apply when the base station knows a group the target UE is assigned to but has no direct link to the UE. In some disclosed embodiments the base station 200 may page the UE 106 but does not receive a paging response. Since the base station knows that another UE 100 of the group is still under coverage, it broad- or multicasts the message for UE 106 to the group. For example, information may be maintained at the base station 200 or another network component on which groups are in coverage of the base station 200. Moreover, information on which UEs a assigned to which groups may also be available, such that a base station 200 may decide based on the available information, whether to use the above mechanism.

Depending on the communication protocols involved, the base station 200 and/or the UE 106 may transmit an acknowledgement packet after reception of the message or data packet. The same mechanisms may apply to the forwarding/relaying of the acknowledgement data packet as lined out above for the message/data packet. The method 50 at the base station 200 may further include receiving the acknowledgment message (uplink) from another 100 UE after transmitting the message (downlink). The method 50 at the base station 200 may further include receiving the acknowledgment message (uplink) from another UE 100 after transmitting the message (downlink).

Figure 8:
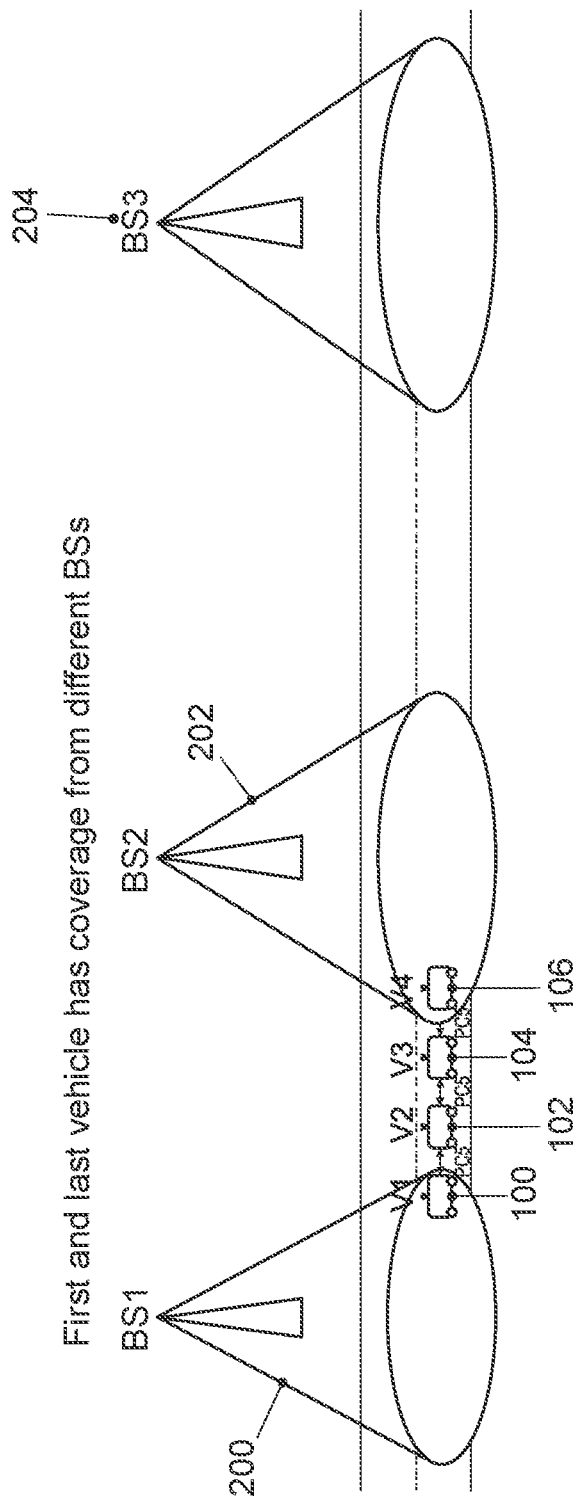
FIG. 8 illustrates a scenario in which two transportation vehicles of a group of transportation vehicles have coverage of different base stations.
Figure 9:
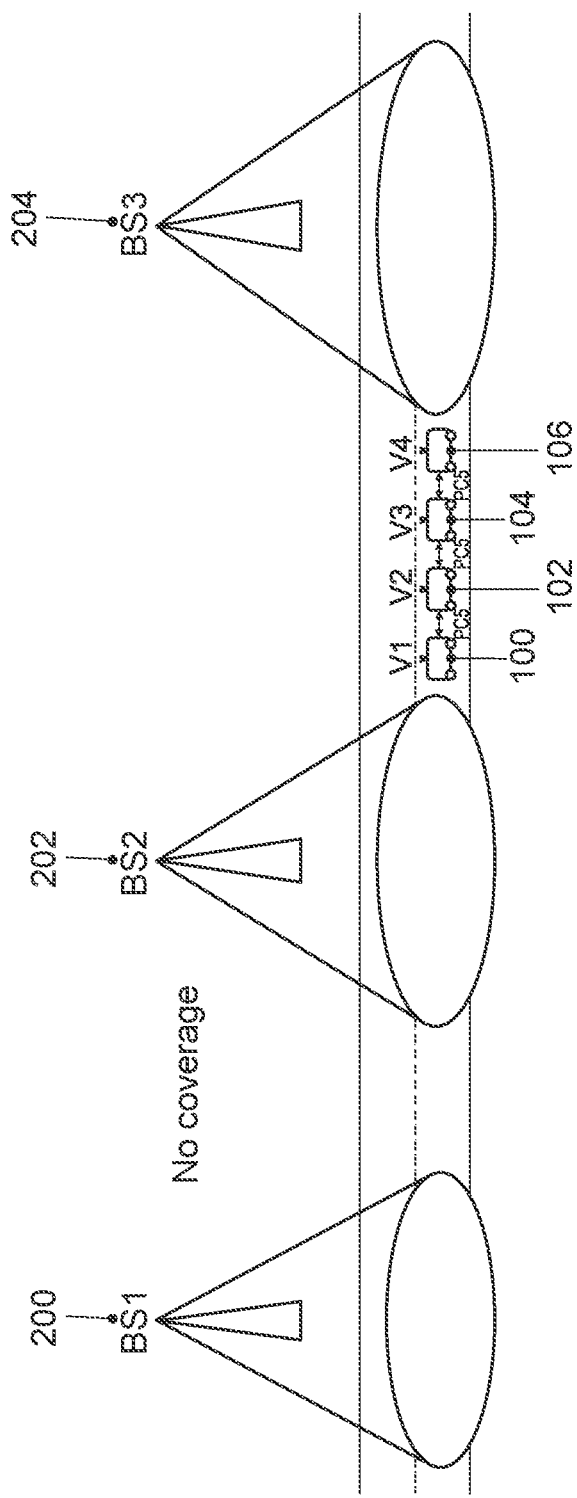
FIG. 9 illustrates an out-of-coverage scenario.

FIG. 8 illustrates a scenario in which two transportation vehicles of a group of transportation vehicles have coverage of different base stations 200, 202. FIG. 8 shows a similar scenario as the previous FIGS. In the scenario depicted UE 100 is in coverage of base station 200 and UE 106 is in coverage of base station 106. UEs 102, 104 would hence have two chances of reaching the network, one through the group chain ending up at base station 200 (via UE 100) and another one through the group ending up at base station 202 (via UE 106). FIG. 9 illustrates an out-of-coverage scenario, in which the group of UEs 100, 102, 104, 106 is located between the coverage areas of base stations 202 and 204. Messages sent out within the group cannot be transmitted outside the group. However they may be buffered and forwarded to a base station when back in coverage. Likewise, a base station cannot transmit any messages to the group and may store such a message until at least one UE of the group can be reached. If the group enters coverage of another base station the base stations may communicated among each other such that the message can be delivered to the group and eventually to the desired recipient.

In disclosed embodiment transportation vehicles may use a communication map (transportation vehicles know where coverage is and where not). Transportation vehicles which are expected to drive close by for certain time through an area with poor coverage may build or form a communication group (CG). A CG may establish a mesh network. In some disclosed embodiments the CG gets a groupcast identification assigned. A request may be sent from one UE towards a BS but in the downlink the group cast address may be used to increase the reception probability. If a requested transportation vehicle was not able to get a response from the BS it may obtain the data via sidelink (e.g., PC5) from the other UE's.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having the ability to perform each of the respective operations of these methods.

LIST OF REFERENCE SIGNS 10 method for user equipment
12 determining a coverage situation of the mobile communication system
14 forming a group of multiple UEs
16 communicating a unicast message to multiple UEs of the group of UEs based on the coverage situation of the mobile communication system
20 method for user equipment
22 receiving a message, which is addressing multiple UEs, from another UE
24 determining whether the message is a unicast message, which was transmitted to multiple UEs
26 relaying the message if it is a unicast message, which was transmitted to multiple UEs
30 apparatus for user equipment
32 one or more interfaces
34 control module
40 apparatus for base station
42 one or more interfaces
44 control module
50 method for base station
52 determining an out-of-coverage situation for user equipment, UE, to which a message is to be sent
54 determining an identification of a group of multiple UEs the UE is assigned to
56 transmitting the message to the group of UEs for relaying to the UE
100 user equipment/transportation vehicle
102 user equipment/transportation vehicle
104 user equipment/transportation vehicle
106 user equipment/transportation vehicle
200 base station, network component
202 base station, network component
204 base station, network component
400 mobile communication system

The invention claimed is:

1. A method for User Equipment (UE) of a transportation vehicle operating in vicinity of a mobile communication network system, the method comprising:
   in response to identifying a message to be transmitted from the UE of the transportation vehicle to another UE, determining whether the UE of the transportation vehicle is within a coverage area of a base station of the mobile communication network system;
   in response to the UE of the transportation vehicle being outside the coverage area of the base station, forming a group including a plurality of UEs, wherein a geographic path of each of the plurality of UEs corresponds to a geographic path of the UE of the transportation vehicle; and
   transmitting the message intended for the another UE as a unicast message to each of the plurality of UEs to be relayed to one of the base station and UE of a different group.

2. The method of claim 1, wherein the unicast message directed to multiple UEs of the group of UEs is included in a multicast or broadcast message and/or the forming of the group of UEs includes assigning a group or groupcast identification to the group of UEs and wherein the method further comprises using the group identification or the groupcast identification to address the unicast message to the group of UEs.

3. The method of claim 1, wherein the forming of the group of UEs includes determining group members based on a common location of the UEs.

4. The method of claim 1, wherein the determining of the coverage situation includes looking up coverage information in a coverage map based on a location of the UE and/or wherein the determining of the coverage situation includes measuring a signal from the mobile communication network system, wherein the signal is indicative of the coverage of the mobile communication network system.

5. The method of claim 1, further comprising receiving a message from another UE which is addressing multiple UEs;
   determining whether the message is a unicast message which was transmitted to multiple UEs; and
   relaying the message in response to the message being a unicast message which was transmitted to multiple UEs.

6. The method of claim 5, wherein the relaying includes relaying the unicast message to another UE, to a base station of the mobile communication network system, or to the group of UEs.

7. A method for a first User Equipment (UE) of a first transportation vehicle operating in vicinity of a mobile communication network system, the method comprising:
receiving a message from a second UE of a second transportation vehicle, wherein the message is addressing multiple UEs, and wherein the message is intended for a third UE of a third transportation vehicle;
determining whether the third UE of the third transportation vehicle is within a coverage area of a base station of the mobile communication network system;
in response to determining that the third UE is outside the coverage area of the base station, determining whether the message is a unicast message transmitted to multiple UEs, wherein the unicast message has one addressee; and
in response to the message being the unicast message transmitted to multiple UEs, identifying a group of a plurality of UEs including the third UE and relaying the message as the unicast message to at least one of the plurality of UEs, wherein a geographic path of each of the plurality of UEs corresponds to a geographic path of the third UE.

8. An apparatus for a User Equipment (UE) of a transportation vehicle operating in vicinity of a mobile communication network system, the apparatus comprising:
a plurality of UE interfaces configured to establish communication with corresponding interfaces of the mobile communication network system; and
a control module communicatively coupled to and configured to control the one or more UE interfaces, wherein the control module is configured to:
in response to identifying a message to be transmitted from the UE of the transportation vehicle to another UE, determine, using the one or more UE interfaces, whether the UE of the transportation vehicle is within a coverage area of a base station of the mobile communication network system,
in response to the UE of the transportation vehicle being outside the coverage area of the base station, form a group including a plurality of UEs, wherein a geographic path of each of the plurality of UEs corresponds to a geographic path of the UE of the transportation vehicle, and
transmit the message intended for the another UE as a unicast message to each of the plurality of UEs to be relayed to one of the base station and UE of a different group.

9. A transportation vehicle comprising the apparatus of claim 8.

10. A method for a base station of a mobile communication network system, the method comprising:
receiving a message intended for a User Equipment (UE) of a transportation vehicle;
determining whether the UE is outside a coverage area of the base station, wherein the message is a unicast message having one addressee;
determining an identification of a group including a plurality of UEs, wherein the UE is one of the plurality of UEs, wherein a geographic path of each of the plurality of UEs corresponds to a geographic path of the UE of the transportation vehicle; and
transmitting the message as the unicast message to several of the plurality of UEs, other than the UE of the transportation vehicle, to be relayed to the UE.

11. The method of claim 10, further comprising receiving an acknowledgment message for the message from a UE of the group.

12. An apparatus for a base station of a mobile communication network system, the apparatus comprising:
one or more base station interfaces configured to establish communication with one or more UE interfaces of UEs of transportation vehicles operating in vicinity of the mobile communication network system; and
a control module configured to control the one or more base station interfaces, wherein the control module is configured to:
receive a message intended for a User Equipment (UE) of a transportation vehicle;
determine whether the message is directed to a User Equipment (UE) of a transportation vehicle is outside a coverage area of the base station, wherein the message is a unicast message having one addressee, determining an identification of a group of multiple UEs to which the UE is assigned, and transmitting the message to the group of UEs for relaying to the UE.

13. A transportation vehicle comprising the apparatus of claim 12.

14. A non-transitory computer readable medium including a computer program having a program code for performing a method for User Equipment (UE) of a transportation vehicle operating in vicinity of a mobile communication network system, when the computer program is executed on a computer, a processor, or a programmable hardware component, the method comprising:
in response to identifying a message to be transmitted from the UE of the transportation vehicle to another UE, determining whether the UE is within a coverage area of a base station of the mobile communication network system;
in response to the UE of the transportation vehicle being outside the coverage area of the base station, forming a group including a plurality of UEs, wherein a geographic path of each of the plurality of UEs corresponds to a geographic path of the UE of the transportation vehicle; and
transmitting the message intended for the another UE as a unicast message to each of the plurality of UEs to be relayed to one of the base station and UE of a different group.

15. A non-transitory computer readable medium including a computer program having a program code for performing a method for a base station in a mobile communication network system when the computer program is executed on a computer, a processor, or a programmable hardware component, the method comprising:
receiving a message intended for a User Equipment (UE) of a transportation vehicle;
determining whether the UE is outside a coverage area of the base station, wherein the message is a unicast message having one addressee;
determining an identification of a group including a plurality of UEs, wherein the UE is one of the plurality of UEs, wherein a geographic path of each of the plurality of UEs corresponds to a geographic path of the UE of the transportation vehicle; and transmitting the message as the unicast message to several of the plurality of UEs, other than the UE of the transportation vehicle, to be relayed to the UE.

* * * * *